(No Model.)

F. BLESSING.
CHUCK.

No. 489,862. Patented Jan. 10, 1893.

Fig. 3ᵃ.

Fig. 3ᵇ.

Witnesses:
J. W. Garfield
H. I. Clemons.

Inventor,
Frank Blessing
By _____
Attys

THE NORRIS PETERS CO., PHOTO-LITHO., WASHINGTON, D. C.

UNITED STATES PATENT OFFICE.

FRANK BLESSING, OF LANCASTER, ASSIGNOR TO FRANCIS X. BLESSING, OF READING, PENNSYLVANIA.

CHUCK.

SPECIFICATION forming part of Letters Patent No. 489,862, dated January 10, 1893.

Application filed June 14, 1892. Serial No. 436,642. (No model.)

*To all whom it may concern:*

Be it known that I, FRANK BLESSING, a citizen of the United States, residing at Lancaster, in the county of Lancaster and State of Pennsylvania, have invented new and useful Improvements in Chucks, of which the following is a specification.

This invention relates to chucks, and to those peculiarly adapted to jewelers' use for holding watch-pivots, pinions, and other small articles, and the invention consists in the peculiar construction and arrangement of the parts of the chuck, all as hereinafter fully described and more particularly pointed out in the claims.

Figure 1:
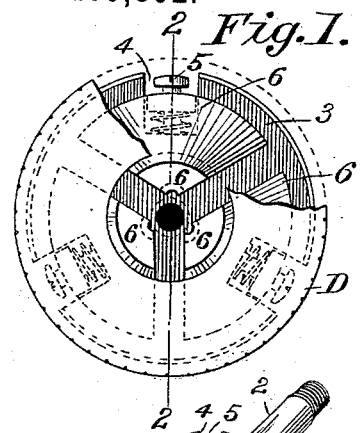
Figure 2:
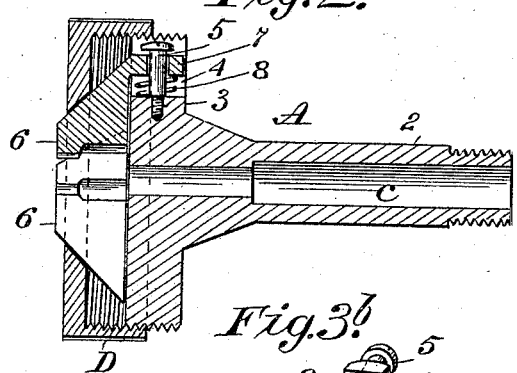
Figure 3:
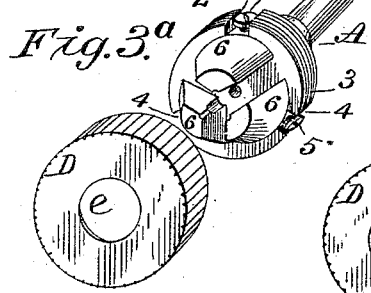
Figure 3:
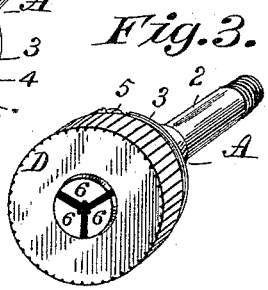
Figure 4:
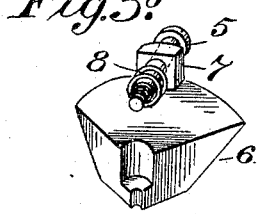
Figure 4:
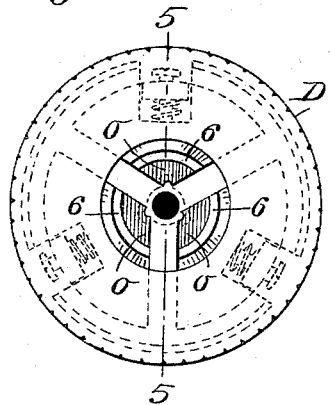
Figure 5:
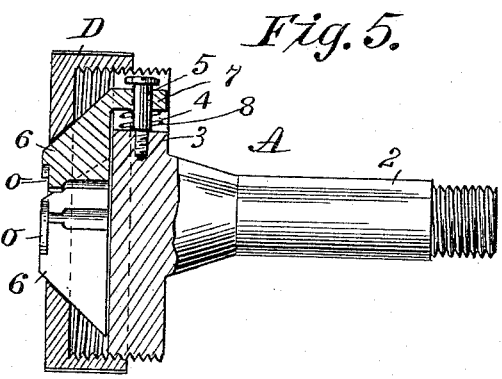
Figure 6:
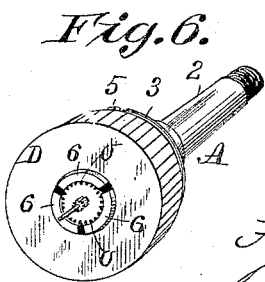

In the drawings forming part of this specification,—Figure 1 is a front elevation showing the chuck-cap partly broken away; Fig. 2 is a longitudinal section on line 2—2, Fig. 1; Fig. 3 is a perspective view; Fig. 3ª, is also a perspective view showing the chuck and cap separated; Fig. 4 is a front elevation; Fig. 5 is a side view showing the chuck-head, and cap in section on line 5—5, Fig. 4; Fig. 6 is a perspective view showing the chuck with a watch-pinion held in the jaws thereof: The several above-mentioned figures, illustrating a chuck embodying my invention. Fig. 3ᵇ, is a perspective view of one of the jaws of the chuck, together with its holding screw and retracting spring.

The object sought to be attained by the use of the within described improvements, is, to provide a chuck which is, by reason of its lightness and simplicity of construction, and its ease of manipulation, peculiarly adapted to the use of jewelers, and watch makers and repairers. Said chuck, however, constitutes a desirable tool for almost any use in the mechanic arts, where such a device is required.

In the drawings A is the body of the chuck consisting of the hollow shank, 2, and the head, 3. The chuck-head, 3, of cylindrial form, is made preferably, integral with its shank, 2, and its periphery is screw-threaded, as shown. The face of the chuck-head is finished to a true plane at right angles to the axial line of the shank, 2, and in its said periphery are formed a series of slots, 4, extending toward said line. The base of each of said slots, 4, is perforated and screw-threaded to receive the threaded end of a jaw-holding and guiding screw, 5, one for each jaw, said screws being made preferably with a shoulder, as shown, at the upper end of their screw-threaded portions whereby, when said screws are placed in the chuck-head, 3, in operative positions, said shoulder shall come to a bearing on the bases of said slots, 4, thereby insuring the accurate and rigid positions thereof for the support and guidance of the chuck-jaws, as hereinbelow set forth. The said chuck-head and shank are longitudinally perforated, thereby forming a chamber therethrough, indicated by $c$, (see Fig. 2) which chamber is preferably of greater diameter in the shank of the chuck than through the head portion thereof. The purpose of the enlargement of said chamber, $c$, in the shank of the chuck, is to provide for introducing therein, if desired, a suitable plunger to be used for moving pieces of wire, or other objects, which may be held by the chuck-jaws, forward, between the latter for successive operations thereon for turning, for forming watch-pivots, or similar objects from said wire.

It will be seen that the extremity of the shank, 2, of the chuck, is screw-threaded to provide for the usual attachment of the chuck to the spindle of a lathe, which spindle, for use with the chuck having said chamber, $c$, therein and to provide for operating the said plunger within the said chamber should, as usual, be a hollow one, so that the rear extremity of said plunger, may extend beyond the rear end of the lathe-spindle for convenient manipulation of said plunger by hand, or otherwise, as may be preferred; or to permit small metal bars or pieces of wire to be pushed through to be held by the chuck for various operations.

It will be found to be obvious, from the further description of the construction and operation of the chuck-jaws, as below set forth, that the chuck may be found useful to a perfectly satisfactory extent for many kinds of work, if it be constructed without said chamber, $c$, through the head and shank thereof, or with a comparatively shallow socket, formed in the face of the chuck centrally back of the meeting point of the jaws thereof. The jaws, 6, of the chuck, are made in the form of segments of a truncated cone, and each is provided with an arm, 7, extending at right angles to its base, which is perforated to receive therethrough the aforesaid supporting and guiding screw, 5. The said arm, 7, on the chuck jaw is fitted to move freely between the sides of said slot, 4, in the head of the chuck, the three jaws of the latter being arranged relatively and attached to said chuck-head by the screws, 5, as shown in the drawings, and more particularly illustrated in Fig. 3$^a$ thereof. A spring, 8, is placed on said screw, 5, between the arm, 7, and the base of the slot, 4, in the chuck-head which serves, by pressure against said arm of the chuck-jaw, to move the latter toward the periphery of the chuck-head, when it is desired to permit the jaws of the chuck to open for receiving or for releasing an article to be placed therein or to be taken therefrom.

Care is taken, in practice, when constructing the chuck, to make the said slots, 4, in the periphery of the chuck-head of such depth as will permit the chuck-jaws, when said springs, 8, shall be fully or nearly compressed, to approach each other to such extent as may be found desirable for the smallest articles that the chuck may be required to hold between its jaws. It will be seen that almost the entire surface of the base of each of the chuck-jaws bears against the plain front face of the head, 3, of the chuck, the arm of each jaw extending into one of said slots, 4, in said head, and being engaged by a screw, 5, whereby the jaw is held in proper operative position on the head and is permitted to move thereon, in a direct line, toward and from the axial line of the chuck. The inner adjoining edges or work-grasping points of said jaws are recessed slightly, as shown, to adapt them to more efficiently clamp an article placed therebetween.

If it be desired to adapt the chuck-jaws, recessed as aforesaid, and as shown in Fig. 3$^a$, to grasp watch-pinions, or similar cylindrical objects by their peripheries, the outer ends of said jaws may be suitably recessed to receive said pinions therein, as shown in Fig. 6, and as illustrated in Figs. 4 and 5, where the recessed portion of the front ends of said jaws is shown at $o$, or each jaw may have a projection on its front end smaller than the border of the recess, $o$, and thus the jaws may engage properly the peripheries of pinions of varying diameters. If preferred, however, it is obvious that several sets of jaws, each set formed and adapted to grasp some article of special shape, may be provided for use with the same chuck-head, for the simple construction of the chuck renders such interchange of jaws very convenient, and such change of jaws can be made without taking the chuck off from its lathe-spindle, for each of the screws, 5, can be easily taken out from the head, a jaw removed and replaced by another one in a few moments. For the purpose of operating the said chuck-jaws or imparting thereto a movement on the face of the chuck-head, toward the axial line of the chuck, whereby said jaws are caused so to move simultaneously and thereby grasp an object therebetween firmly, and to provide all necessary support for said jaws near their outer ends, whereby they shall be held rigidly against the article clamped between them, the chuck-cap, D, is provided, and is internally screw-threaded, and is screwed onto the chuck-head, 3, as shown, said cap having a circular perforation, $e$, through its base, the inner border of which is beveled, as shown in Figs. 2 and 5, at an angle corresponding to the conical form of the outer sides of the chuck-jaws, 6. The chuck-jaws are so fitted and adjusted to the chuck-head, that when said cap, D, is removed from the chuck, the jaws occupy, normally, a separated position, substantially such as is shown in Fig. 3$^a$, the springs, 8, operating against the arm, 7, of the jaws to bring the latter to said positions, or to a fully open one. Upon screwing the cap, D, onto the chuck-head the said inner beveled border of the perforation, $e$, will come to a bearing against the outer conical sides of the jaws, thereby bringing the outer face of the cap and the outer ends of said jaws to a corresponding plane after said cap shall have been screwed about half way onto said head. By continuing to turn the cap, after placing an object between the jaws to be clamped, the latter are caused to slide on said head and are held against said object. It will be observed that the peculiar construction of the chuck, herein described, presents facilities for operating the same conveniently, for the reason that the said cap of the chuck is easily grasped by the operator to screw on or unscrew the cap quickly, when the chuck may be turning in the right direction.

A feature of simplicity in the construction of the within described chuck consists in making the face of the head thereof entirely smooth and unbroken, except for the slots, 4, in its border, thereby obviating the expense of cutting (as heretofore practiced), more or less dove-tail radial grooves in said face, and fitting jaws to slide therein, operated by a separate screw for each jaw, or by a scroll plate. Thus the bases of the jaws, herein described, slide on said smooth face, and with a minimum degree of friction.

What I claim as my invention, is:—

1. A chuck-head having radial slots in its periphery and having a threaded socket at the base of each of said slots, in combination with a series of chuck-jaws each having a perforated arm adapted to enter one of said slots in the chuck-head, a screw passing through each of said arms and engaging the socket at the base of the slot, a spring arranged under each arm and a perforated cap adapted to be screwed over said chuck-head, each of said chuck-jaws having a beveled outer face adapted to be engaged by said cap, substantially as set forth.

2. A chuck-head consisting of a shank having a cylindrical head, said head having radial slots formed in its periphery, in combination with a series of removable chuck-jaws each having the form of a section of a truncated cone, each of said jaws having a flat base arranged to move across the face of the said chuck-head, and being provided with an arm which enters one of the slots in said head, springs arranged in said slots under said arms of the respective chuck-jaws, and a centrally perforated cap plate adapted to be screwed over said head, substantially as set forth.

3. A chuck-head having radial slots in its periphery and having a shank, in combination with a series of chuck-jaws each consisting of a conic section having an arm of less width than the chord of the arc of the base of said section, said arm being arranged in one of the radial slots in the chuck head, springs arranged in said slots under said arms of the respective chuck-jaws, and a centrally perforated cap plate adapted to be screwed over the said chuck-head, substantially as set forth.

FRANK BLESSING.

Witnesses:
J. C. HAHN,
KENDIG H. BARE.